Jan. 7, 1941. A. A. SCOTT, JR 2,227,865
BUTTON GRINDING MACHINE
Filed March 7, 1938 5 Sheets-Sheet 1
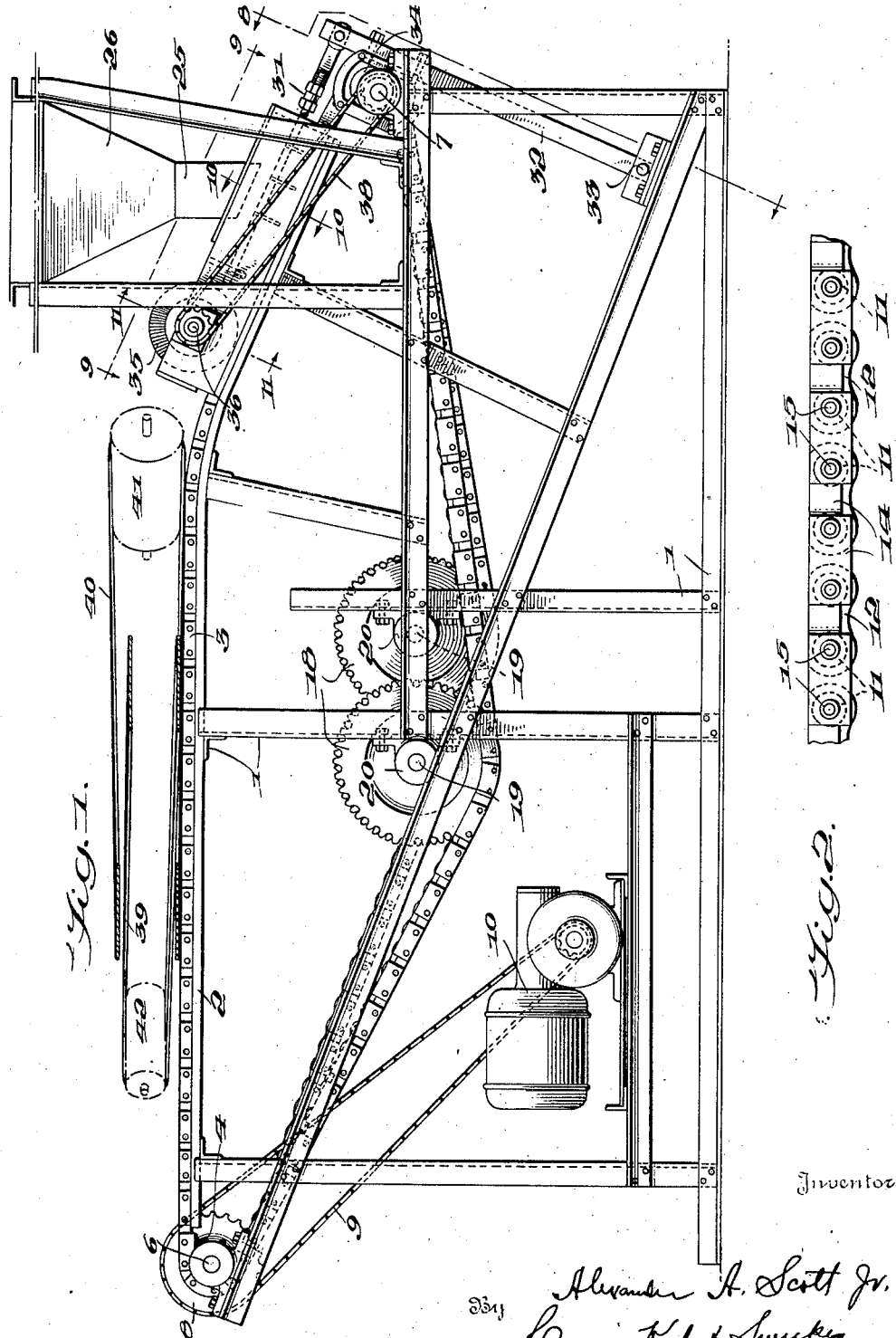

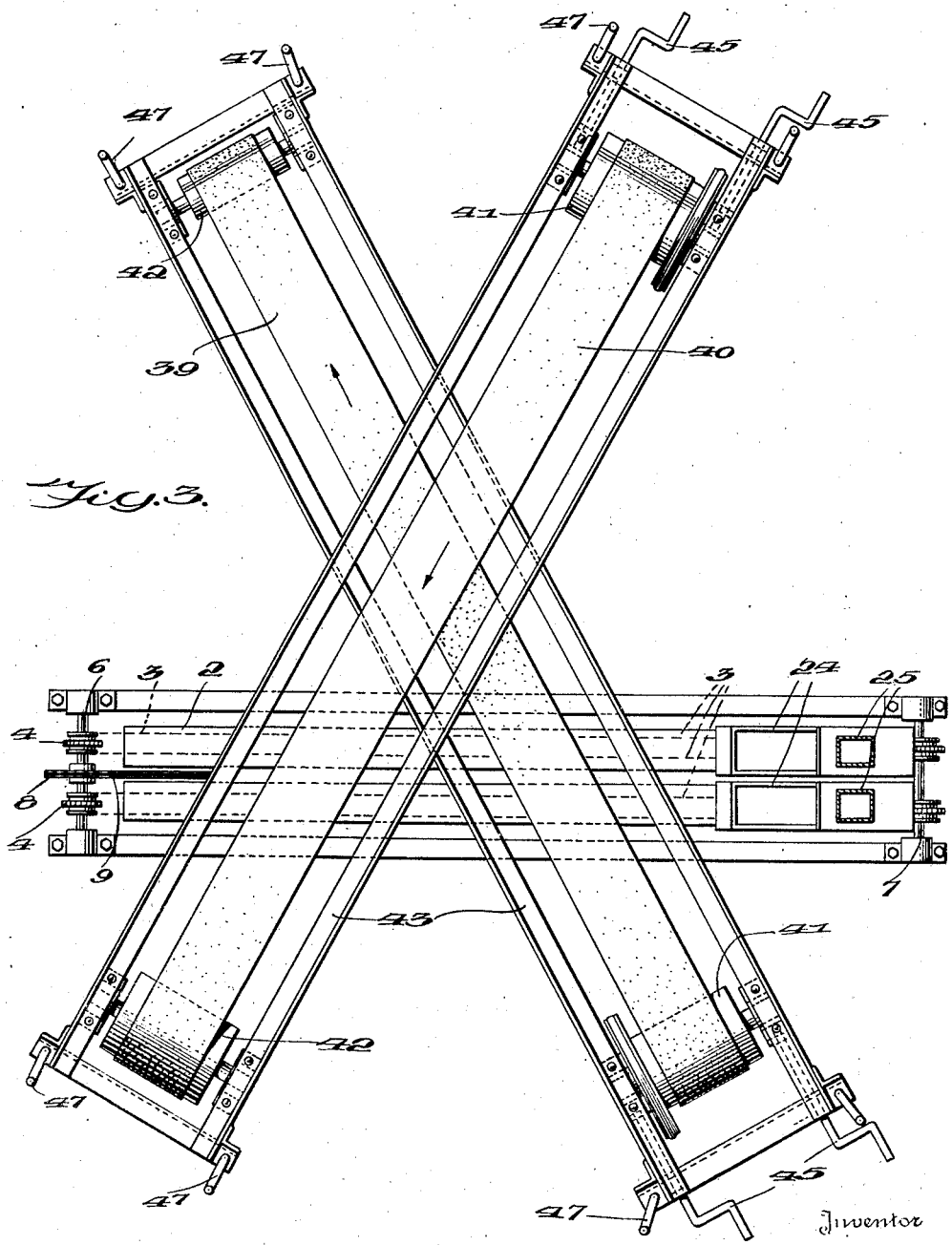

Jan. 7, 1941.   A. A. SCOTT, JR   2,227,865
BUTTON GRINDING MACHINE
Filed March 7, 1938   5 Sheets-Sheet 3
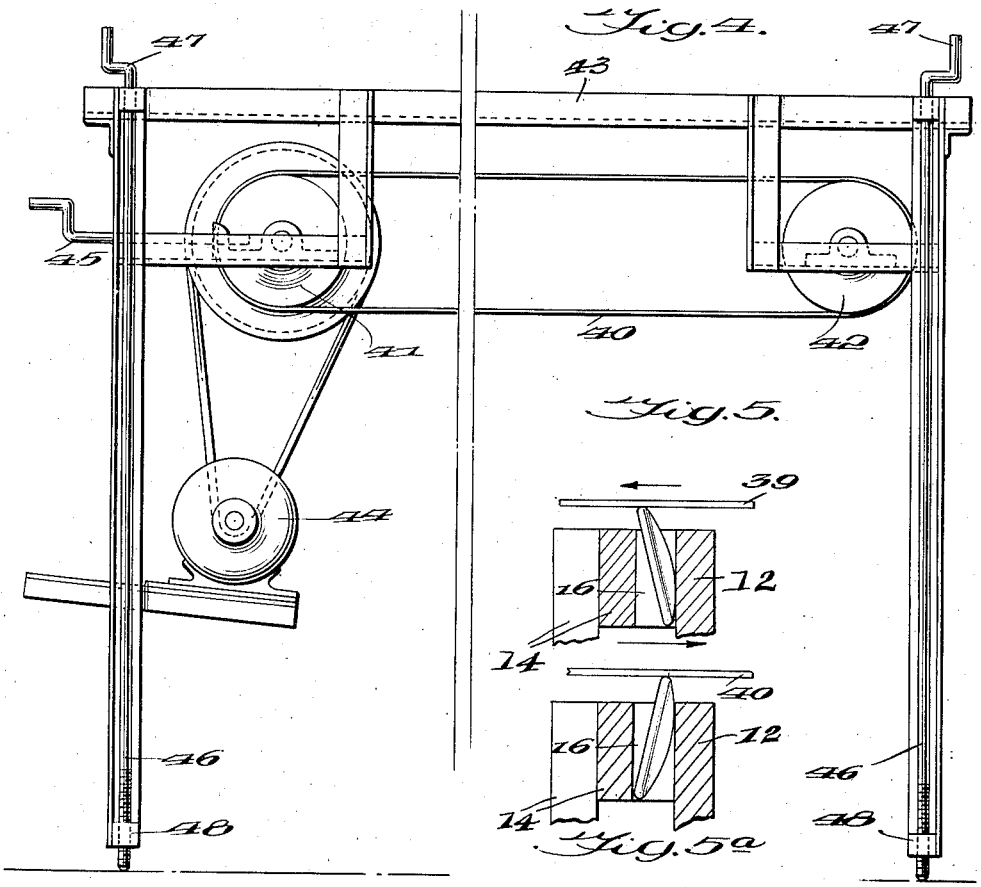
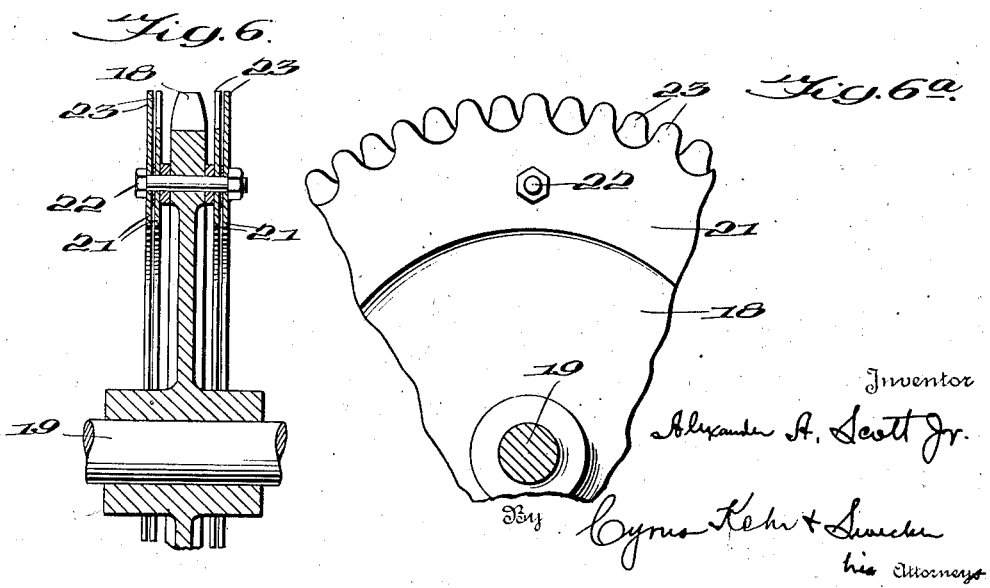

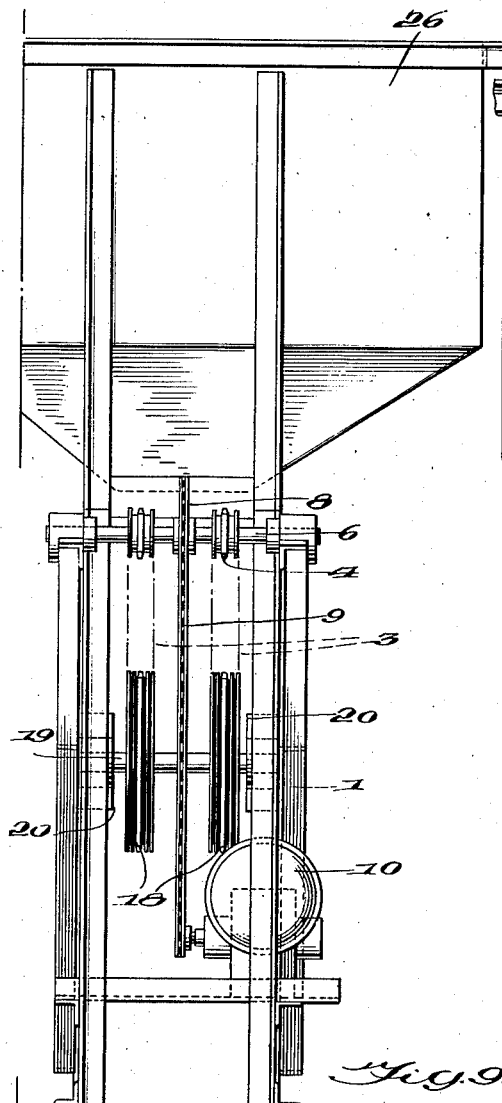

Jan. 7, 1941.  A. A. SCOTT, JR  2,227,865
BUTTON GRINDING MACHINE
Filed March 7, 1938  5 Sheets-Sheet 5
Fig. 10.
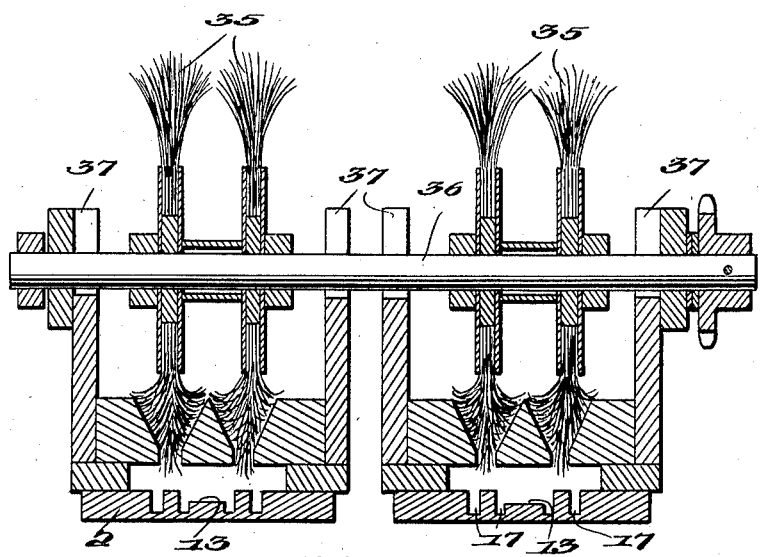
Fig. 11.
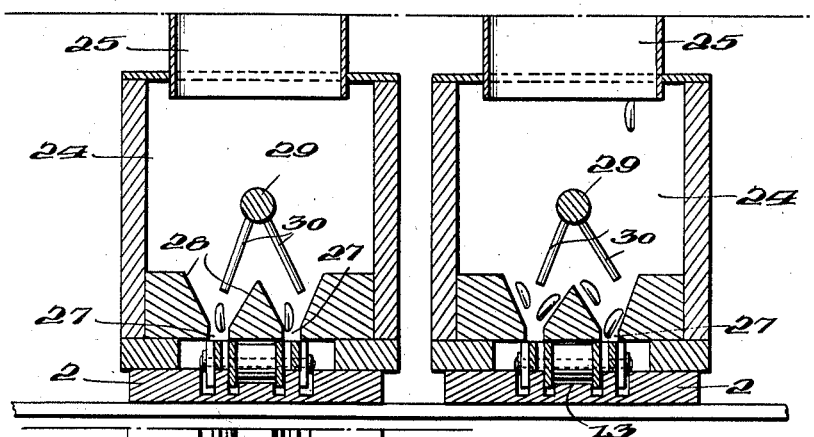
Fig. 12.
Inventor
Alexander A. Scott Jr.
By Cyrus Kehr & Swenka
his Attorneys Patented Jan. 7, 1941

2,227,865

UNITED STATES PATENT OFFICE 2,227,865

BUTTON GRINDING MACHINE

Alexander A. Scott, Jr., Knoxville, Tenn., assignor to The Patent Button Company of Tennessee, Knoxville, Tenn., a corporation of Tennessee Application March 7, 1938, Serial No. 194,484

16 Claims. (Cl. 51—138)

This invention relates to an improvement in button edging machines of the character employed to finish the edges of circular articles, such as molded buttons.

In making buttons and similar articles from plastic material such as artificial resins or other thermosetting or thermoplastic materials that harden under heat and pressure or upon subsequent cooling, such articles are usually formed in a two-part mold. The resinous material usually in the shape of compressed pellets is placed between the parts of the mold and the two halves are moved together under substantial heat and pressure to shape the pellets into the desired articles to be formed. Where the mold sections meet, the material is usually extruded slightly, leaving fins on the edges of the molded articles, such as buttons, and it has been difficult heretofore to remove these fins and to smooth off the edges of the buttons with proper finish and polish.

The object of this invention is to improve the method and apparatus for polishing off the edges of such articles automatically and to provide the desired wedge-shaped edge preferably provided on such articles as buttons.

This object is accomplished by the provision of a conveyor which carries the buttons along in edgewise relation and presents them successively to abrading devices, such as traveling sand belts which act successively on opposite sides of the edges of each button to remove the surplus material and to finish and polish the edge thereof to the desired extent, leaving such edges round and smooth, as required in the button trade.

Provision is also made in this embodiment of the invention for proper feeding of the molded articles into the pockets of the endless conveyor in several rows and to support these for rolling motion along the conveyor and into contact with the abrading devices which smooth and polish the edges thereof. It is preferable to employ a conveyor of the character of an endless chain having rollers for supporting the same on a guide plate with the provision of pockets in the chain constructed and arranged to receive and hold the buttons in edgewise relation in presenting the same to the abrading means.

The invention is illustrated in a preferred embodiment thereof in the accompanying drawings in which:

Fig. 1 is a side elevation of the conveyor and hopper structure of the machine, with the major portion of the abrading means removed for clearness;

Fig. 2 is a side elevation of the conveyor chain;

Fig. 3 is a top plan view of the machine showing the relation of the abrading devices and conveyors;

Fig. 4 is a side elevation of one of the abrading devices removed;

Figs. 5 and 5a are diagrammatic views showing the manner of abrading the opposite edges of the buttons;

Figs. 6 and 6a are side elevation and partial sectional views respectively of a portion of one of the guide sprocket wheels;

Fig. 7 is an end elevation of the machine, taken from the left in Fig. 1;

Fig. 8 is an end elevation and partial sectional view taken substantially on the line 8—8 of Fig. 1;

Fig. 9 is a partial longitudinal sectional view substantially on the line 9—9 of Fig. 1;

Fig. 10 is a vertical sectional view through the feed boxes on the line 10—10 of Fig. 1;

Fig. 11 is a similar view on the line 11—11 of Fig. 1; and

Fig. 12 is a top plan view of the chain and its guide plate.

In some of the views, portions of the machine have been omitted for the sake of clearness.

The invention is designed for the grinding and polishing of the edges of articles which are usually round, such as are formed in molds that leave fins or rough edges on the articles. The invention is described in connection with buttons, for which it was particularly developed, but it will be understood that it was not limited thereto and may be used for the grinding and polishing of other articles of similar nature, wherever desired.

The invention provides, in the preferred embodiment thereof, a conveyor for the buttons in cooperation with a feeding hopper which supplies the buttons to the conveyor for movement to the abrading means. The latter preferably comprises a pair of endless sand belts separately mounted and driven and arranged in overlapping relation for successive action on the buttons.

Button conveyor

The conveyor unit has a skeleton frame designated generally by the numeral 1, which is shown as made up of steel angles riveted or otherwise fastened together to form a rigid structure for supporting the operating parts of the conveyor unit. Extending lengthwise of the frame 1, along the upper side thereof, is a pair of guide plates 2 adapted to support and guide the upper runs of endless conveyors, preferably sprocket chains, one for each guide plate 2, as illustrated, or one guide plate may be used for several conveyors, if desired. Although two such conveyors are used in the illustrated embodiment of the invention, it will be evident that any desired number may be used.

The endless conveyors are generally designated by the numeral 3 and are shown as of special construction as will be described hereafter.

The sprocket chains 3 pass over sprocket wheels 4 and 5 at respective opposite ends of the machine mounted on shafts 6 and 7, respectively. The shaft 6 carries a drive sprocket 8, driven by sprocket chain 9 from a power unit 10, shown as an electric motor provided with speed reducing means.

Each guide plate 2 has a track therealong, as shown particularly in Figs. 10 and 11 to guide the movement of the endless conveyor or chain. The conveyor chain is shown as built up of a standard roller chain with side links added to provide pockets for edgewise guiding of the buttons. As shown in Figs. 2, 11 and 12, the chain rollers are designated generally by the numeral 11, being connected together by the usual links 12, the rollers being adapted to travel along a track 13 provided in the upper surface of the guide plate 2. Additional links 14 are secured on opposite sides of each chain by pins 15 passing through the adjacent ends thereof and through the links 12 and rollers 11 to pivotally connect these together and to provide spaces 16 between the links which form pockets for receiving the buttons, as shown generally in Fig. 11, and also in Figs. 5 and 5a. Along opposite sides of the track 13 are grooves 17 to receive the edges of the links 12 and 14 and guide the movement of the conveyor chain, the portion of the plate between the grooves 17 forming a supporting surface for the buttons along which they are moved in edgewise relation by the conveyor chains, which serves to roll them along the plates.

The bottom run of each conveyor chain passes under a guide sprocket of which there is a separate sprocket for each chain, these being designated by the numeral 18 and mounted on shafts 19 journaled in bearings 20 attached to the frame 1, but being vertically adjustable relative thereto as by bolts and slots in order to adjust the tension of each chain individually according to the relative vertical position of the sprocket 18.

In addition to the tightening action of these sprockets on the chains, each sprocket 18 is provided with side plates 21 secured thereto, as shown in Fig. 6, by means of bolts 22. Each side plate 21 is formed of a pair of disc-like rings mounted in slightly spaced relation and having staggered fingers 23 thereon, arranged to enter the pockets 16 of the chain as the latter passes by the sprocket 18 to clean the chain of any buttons that might stick in the pockets thereof after having passed over the sprocket 4 located at the point of discharge.

Button hopper

At the intake end of the machine, the conveyor chains 3 pass through feed boxes 24, one being provided for each chain, and which boxes are kept substantially full of buttons being supplied by pipes 25 from a hopper 26 supported on a super structure of the frame 1.

The bottom of each box 24 has a pair of slots 27 extending substantially throughout the entire length thereof, each slot having sloping sides 29 tending to slide the buttons edgewise into the pockets 16 of the conveyor chain as the latter moves along its track 13 beneath the slots 27 in the proper relation for the filling of the pockets 16 with buttons, one in each pocket. In order to facilitate the feeding of the buttons into the pockets of the conveyor chains 3, each box 24 has a feed rod 29 extending lengthwise therein with projections 30, extending downwardly in the spaces over the slots 27 to agitate the buttons therein and prevent clogging of the feed slots. These feed rods 29 are connected with a cross head 31 for lengthwise adjustment and are reciprocated by means of a lever 32 pivoted at 33 to the frame 1, as shown in Figs. 1 and 8, and this lever is moved back and forth by an eccentric 34 mounted on the shaft 7 to cause swinging movement of the lever 32 and lengthwise reciprocation of the rods 29.

Mounted in the forward ends of the boxes 24 over the slots 27 are brushes 35, as shown in Figs. 1, 9 and 10, the bristles of which extend through the slots sufficiently far to clean the chains and force back in the boxes any buttons not in the proper pockets of the chains. These brushes 35 are mounted on a shaft 36 journaled in notches 37 in the sides of the boxes 24 in order that the brushes and shaft may be lifted out for the replacement of the brushes whenever required. The shaft 36 is driven by a sprocket chain 38 from shaft 7, as shown in Fig. 1.

Abrading unit

Cooperating with the conveyor unit of this machine is a unit for grinding and polishing the edge portions of the buttons as the latter are conveyed along the guide plates 2 by the chains, which abrading unit is shown as formed of a pair of endless sand belts arranged in crossed relation substantially as shown in Fig. 3. Each of these belts is separate from the other and is independently mounted and driven for different angular placement with respect to each other and relative to the conveyor as well as for adjustment toward and from the surface of the latter.

The endless sand belts are designated generally by the numerals 39 and 40, each being formed in the shape of an endless belt and provided with suitable or desired abrading material on the periphery thereof, capable of grinding and polishing the edge portions of the buttons that move in contact with the endless abrading belts. These are arranged in crossed relation and are operated in opposite directions so that the buttons which are loose in the pockets 16 will be turned first to one side and then to the other by the successive belts 39 and 40, as will be apparent from Figs. 3, 5 and 5a, thus tending to smooth off and polish the edges of the buttons without leaving the edges flat but rather providing the desired relatively wedge-shaped edges.

Each sand belt 39 and 40 is mounted on drive and driven pulleys 41 and 42, respectively, journaled in a frame 43 substantially as shown in Fig. 4. Each belt is driven by a separate motor 44 having an operative connection with the drive pulley 41. The drive pulley 41 is mounted for adjustment lengthwise of the frame 43 to adjust the tension of the belt, such adjustment being provided by cranks 45 on shafts having screw-threaded connections with the bearings of the drive pulley 41, as will be apparent from Figs. 1 and 4.

The endless belt 39 projects through the space between the upper and lower runs of the belt 40, the lower runs crossing in such relation as to act individually on the buttons as the latter move successively under the belts. The adjustment of the belts toward and from the working surface and the buttons is made individually for each belt by supporting the frame 43 on adjustable rods 46, one for each corner of the frame with a handle 47 connected therewith for turning the same. The lower portion of each rod is screw-threaded in a block 48 attached to the lower portion of the leg of the frame 43, so that turning of the handle 47 will raise or lower the corresponding portion of the frame. By adjusting one or both ends of the frame, the belt may be adjusted vertically or at an angle relative to the buttons in order to provide the proper and desired contact with the buttons at the points where the latter pass under the belts and yet maintain a separation between adjacent runs of the belts where they cross each other.

Operation

In molding buttons from plastic material which hardens under heat and pressure, the buttons usually have fins and rough edges around their peripheries when they are discharged from the molds. They may be placed first in a tumbling mill to subject them to a tumbling action for the removal of the major portions of these fins, and thereafter or directly from the molds, the buttons are placed in the hopper 26 where they feed down by gravity through the pipes 25 to fill the boxes 24. With the sand belts and conveyor chains operating in the directions indicated by the arrows in Fig. 3, the chains will pass along the tracks 13 of the guide plates 2, moving the pockets 16 under the slots 27 in the boxes 24 for feeding of the buttons edgewise into the respective pockets, one in each. This feeding action is facilitated by the feed rods 29 and their fingers 30. The buttons then pass under the brushes 35 which brush back any excess buttons not housed within the pockets 16.

The buttons are loose in the pockets and are caused to roll along the surface of the stationary guide plates 2, as directed by the conveyor chains, into substantial edgewise contact with the under surfaces of the respective abrasive belts 39 and 40 which act alternately on the edge portions of the buttons to grind and polish these. This forward rolling movement of the buttons is encouraged also by the angle at which the abrasive belts contact the edges of the buttons relative to the path of movement thereof. The revolutions of the buttons can be increased or decreased by increasing or decreasing this angle of the abrasive belts. Due to the loose mounting of the buttons in the pockets and the opposite direction of movement of the successive abrasive belts, the buttons will be turned first to one side and then to the other, as shown in Figs. 5 and 5a for grinding and polishing the respective sides of the edges thereof, leaving these edges relatively wedge-shaped or rounded and convex rather than too blunt or plane.

After passing under the sand belts, the buttons are conveyed to the left hand end of the machine as shown in the drawings, where they are discharged from the conveyors into a suitable receptacle or bin. After the chains pass around the sprockets 4, if any of the buttons should stick in the pockets, the fingers 23 of the sprockets 18 project through the pockets from the inside as the chains pass around these idle sprockets and force out such buttons against remaining in the pockets.

For buttons of different sizes, the width of the button pockets 16 may be increased by means of small washers between the links which may be removable if desired by the use of link pins with cotter keys for holding these in place.

I claim:

1. A method of grinding disc-like objects comprising moving the objects along a path in edgewise relation while said objects are free to tilt in opposite directions, grinding the edge portions of the objects during movement along said path by traversing the same with abrasive actions substantially in opposite directions causing the objects to tilt first to one side and then to the other.

2. A method of grinding buttons molded of a material that hardens comprising rolling the buttons along a path in upstanding edgewise relation while the buttons are free to tilt in opposite directions, grinding the edge portions of the buttons during movement along said path by traversing the path with abrasive actions in substantially opposite directions transversely thereof causing the buttons to tilt first to one side and then to the other.

3. In a grinding machine for disc-like objects, the combination of an endless abrading device having a peripheral grinding surface, an endless conveyor extending transversely of said abrading device, said conveyor having a series of pockets therein constructed and arranged to receive disc-like objects in edgewise relation and to present the edges of said objects to the abrading device, each of said pockets having opposite sides permanently spaced apart a distance greater than the thickness of the object providing for looseness of the object in the pocket free to tilt relative thereto.

4. In a grinding machine for disc-like objects, the combination of an endless abrading device having a peripheral grinding surface, an endless conveyor extending transversely of said abrading device, said conveyor having a series of pockets therein constructed and arranged to receive disc-like objects loosely in edgewise relation and to present the edges of said objects to the abrading device, each of said pockets having opposite sides permanently spaced apart a distance greater than the thickness of the object providing for looseness of the object in the pocket free to tilt relative thereto, said pockets being open from side-to-side of said conveyor, and means for guiding a run of said conveyor extending to the abrading device and supporting the objects in the pockets during movement therealong.

5. In a button grinding machine, the combination of an endless abrading device having a peripheral grinding surface, of an endless conveyor extending transversely of said grinding device and having a series of pockets therein extending transversely through the conveyor constructed and arranged to receive disc-like objects in edgewise relation, a guide plate supporting a run of said conveyor extending to the abrading device, said pockets extending through the conveyor to the guide plate for supporting thereon the objects in the pockets, and means for feeding objects into the pockets of the conveyor.

6. In a machine for grinding disc-like objects, the combination with abrading means, of means for presenting disc-like objects to the abrading means comprising an endless conveyor having sets of links at opposite sides thereof spaced apart to receive a sprocket wheel therebetween, one of said sets of links comprising at least three series of links connected together in side-by-side abutting relation with the links of the respective series staggered relative to each other and with the links in the intermediate series longitudinally spaced from each other providing pockets therein between the links to receive the disc-like objects in edgewise relation.

7. In a machine for grinding disc-like objects, the combination with abrading means, of means for presenting disc-like objects to the abrading means comprising an endless conveyor chain having a series of rollers connected together by links at opposite sides of the conveyor, said links at each side of the conveyor chain being arranged in staggered relation providing pockets therebetween to receive disc-like objects in edgewise relation.

8. In a machine for grinding disc-like objects, the combination with abrading means, of means for presenting disc-like objects to the abrading means comprising an endless conveyor having a series of rollers connected together by links at opposite sides of the conveyor, said links being arranged in staggered relation providing pockets therebetween to receive disc-like objects in edgewise relation, and a guiding plate for a run of said conveyor extending to the abrading means, having a track therein, said plate receiving the rollers and having grooves therein for the links and having a surface for supporting the disc-like objects in the pockets.

9. In a machine for grinding disc-like objects, the combination with abrading means, of means for presenting disc-like objects to the abrading means comprising an endless conveyor having a series of rollers connected together by links at opposite sides of the conveyor, said links being arranged in staggered relation providing pockets therebetween to receive disc-like objects in edgewise relation, a guiding plate for a run of said conveyor extending to the abrading means, having a track therein, said plate receiving the rollers and having grooves therein for the links and having a surface for supporting the disc-like objects in the pockets, means for feeding objects into the pockets, and guiding means for the opposite run of the conveyor having fingers in position to enter the pockets and eject buttons therefrom.

10. In an abrading machine, the combination of a pair of endless abrading devices, one extending between the runs of the other in crossed relation, means for conveying articles by said abrading devices at one side of the point of crossing thereof for successive action of the abrading devices thereon, and means for operating said abrading devices in different directions.

11. In a button grinding machine, the combination of abrading means, an endless conveyor having pockets therein for receiving buttons with an upper run extending to said abrading means, sprocket wheels receiving said conveyor thereon and engaging the same beside the pockets therein, and means other than the sprocket wheels and arranged above the lower run of the conveyor and operating in the plane of the pockets for entering the pockets to eject the buttons therefrom.

12. In a grinding machine for disk-like objects, the combination of abrading means, a conveyor having sprocket engaging portions and having pockets therein beside said sprocket engaging portions and adapted to receive said objects and to direct the same into contact with the abrading means at one side of the pockets, guide sprockets for the conveyor co-acting with said sprocket engaging portions, and means arranged in the same plane as the pockets and operating in said plane to enter the opposite side of the pockets from the side passing the abrading means to eject the objects therefrom.

13. In a grinding machine for disk-like objects, the combination of abrading means, an endless sprocket chain conveyor having spaces between the links thereof with pockets therein beside the spaces adapted to receive said objects and convey the same to the abrading means at one side of the pockets, a sprocket wheel receiving said endless conveyor and having teeth engaging in said spaces thereof, means connected with said sprocket wheel in position to enter the pockets to eject the objects therefrom.

14. In a grinding machine for disc-like objects, the combination of conveying means having pockets therein for receiving disc-like objects in edgewise relation, said pockets being constructed of appreciably greater width than the thickness of the objects for loosely receiving the objects whereby the objects may swing from side to side in the pockets, and abrading means in position to act transversely of the conveyor on the objects.

15. In a grinding machine for disc-like objects, the combination of conveying means having pockets therein for receiving disc-like objects in edgewise relation, said pockets being constructed of appreciably greater width than the thickness of the objects for loosely receiving the objects whereby the objects may swing from side to side in the pockets, and abrading devices extending transversely of the conveyor at longitudinally spaced points thereof and acting respectively in opposite directions on the objects moving said objects to respective opposite sides of the pockets while acting thereon.

16. In an abrading machine for disc-like objects, the combination of conveying means for receiving and holding objects loosely free for lateral movement relative thereto, and abrading devices extending transversely of the conveyor at longitudinally spaced points thereof and constructed for rectilinear movement transversely of the conveying means, and acting respectively in opposite directions on the edges of the objects.

ALEXANDER A. SCOTT, Jr.